United States Patent [19]

Sato

[11] 4,153,934

[45] May 8, 1979

[54] MULTIPLEX DATA PROCESSING SYSTEM

[75] Inventor: Masayuki Sato, Ohme, Japan

[73] Assignee: Tokyo Shibaura Electric Co., Ltd., Kawasaki, Japan

[21] Appl. No.: 763,244

[22] Filed: Jan. 27, 1977

[30] Foreign Application Priority Data

Feb. 10, 1976 [JP] Japan .................. 51/12810

[51] Int. Cl.² .................. G06F 9/18; G06F 15/16
[52] U.S. Cl. .................. 364/200
[58] Field of Search ... 364/200 MS File, 900 MS File

[56] References Cited

U.S. PATENT DOCUMENTS

| | | | |
|---|---|---|---|
| 3,528,062 | 9/1970 | Lehman et al. | 364/200 |
| 3,593,300 | 7/1971 | Driscoll et al. | 364/200 |
| 3,665,421 | 5/1972 | Rehhausser et al. | 364/200 |
| 3,716,838 | 2/1973 | Beard | 364/200 |
| 3,774,163 | 11/1973 | Recoque | 364/200 |
| 3,905,023 | 9/1975 | Perpiglia | 364/200 |
| 4,015,242 | 3/1977 | Anceau et al. | 364/200 |
| 4,084,224 | 4/1978 | Appell et al. | 364/200 |

*Primary Examiner*—Mark E. Nusbaum
*Attorney, Agent, or Firm*—Oblon, Fisher, Spivak, McClelland & Maier

[57] ABSTRACT

The multiplex data processing system comprises a plurality of data processing units connected to form a non-hierachical structure, a shared memory device commonly used by the plurality of data processing units and a job registration unit accessable to the shared memory device for causing the plurality of data processing units to execute their interrupting services. The job registration unit includes circuit means for storing a plurality of job service requests for judging the order of priority of the job service requests, for generating an address signal, and for generating a read/write signal and interruption signal. The shared memory device comprises destructive reading memory cells, a circuit for judging the order of priority of the job service request sent from the job registration unit and the job service request transmitted from the data processing units, and a circuit controlling the READ/WRITE signals sent from the job registration unit and the data processing units.

12 Claims, 10 Drawing Figures

FIG. 4

| TYPE CLASSIFICATION | (a) | (b) | (c) | (d) | (e) |
|---|---|---|---|---|---|
| LOGICAL CIRCUIT SYMBOL | A → [d/dt] → B | AB → [A] → C | AB CD → [A][A] OR → E | A → [N] → B | AB C DE → [A][A] F/F → F; H G |
| LOGIC | B VARIES IN THE FORM OF 1,0,1 FALLING EDGE OF C | $C = \overline{A \cdot B}$ | $E = \overline{A \cdot B + C \cdot D}$ | $B = \overline{A}$ | $H = A \cdot B \cdot C$ $G = D \cdot E \cdot C + \overline{F}$ (INVERTS AT THE FALLING EDGE OF C) |

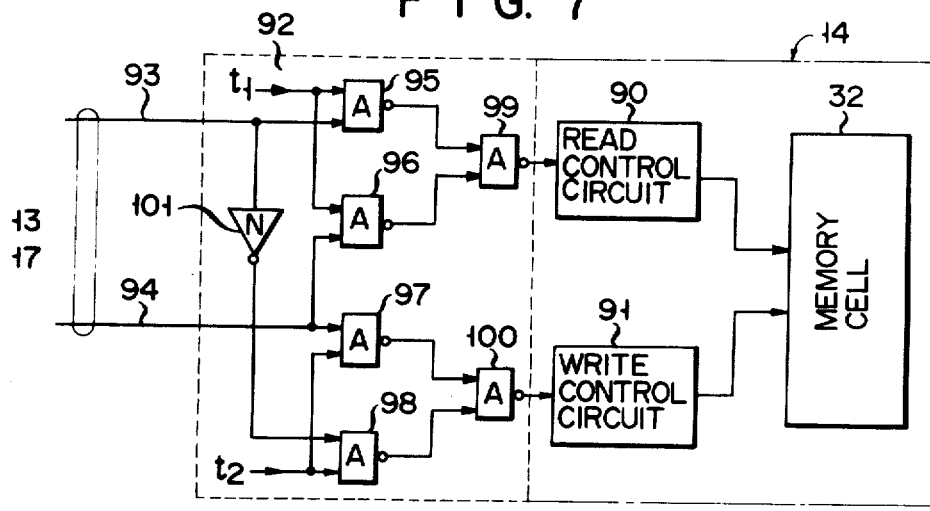

FIG. 7

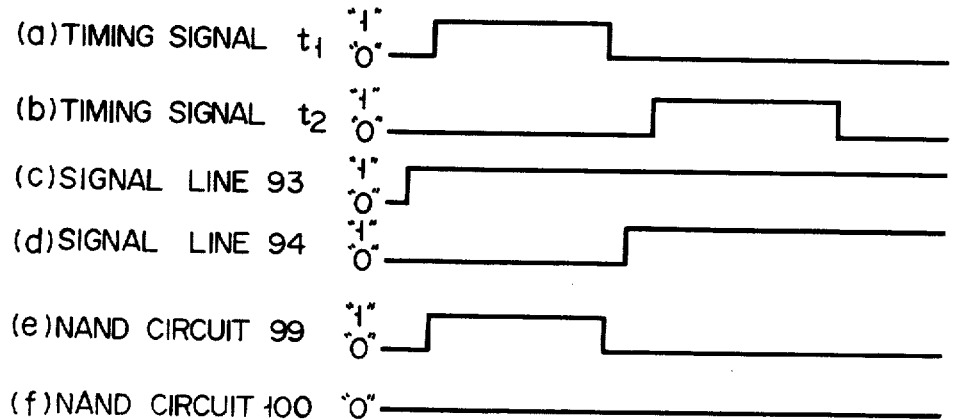

FIG. 8

(a) TIMING SIGNAL t₁
(b) TIMING SIGNAL t₂
(c) SIGNAL LINE 93
(d) SIGNAL LINE 94
(e) NAND CIRCUIT 99
(f) NAND CIRCUIT 100

(a) CLK CLOCK
(b) IN01
(c) FLIP-FLOP (46)
(d) IN10
(e) FLIP-FLOP (47)
(f) FLIP-FLOP (52)
(g) FLIP-FLOP (50)
(h) DATA READY SIGNAL
(i) FLIP-FLOP (54)
(j) FLIP-FLOP (58)
(k) FLIP-FLOP (57)
(l) REQUEST SIGNAL
(m) ADDRESS SIGNAL
(n) WRITE SIGNAL
(o) API SIGNAL
(p) FLIP-FLOP (71)
(q) FLIP-FLOP (72)

MULTIPLEX DATA PROCESSING SYSTEM

BACKGROUND OF THE INVENTION

This invention relates to a multiplex data processing system including a computer system provided with two or more interconnected processors each having arithmetic and logic units and each capable of operating independently, and, more particularly, to a data processing system wherein a single memory device is commonly used by a plurality of data processing units and wherein a specific job is performed according to the order of priority of the jobs requested.

A complex or multiplex data processing system in which a single memory device is used in common has been developed for the purpose of improving the capability and reliability of a data processing system and for efficiently utilizing system resources such as memory devices and peripheral units.

Where a multiplex data processing system is made up of a plurality of data processing units, the capability of the data processing is increased many times. Actually, however, the processing capability would not be increased so much because such system resources as the memory devices and peripheral units operate concurrently and the low response speed of the software which smoothly administrates the entire system.

The methods of constructing a multiplex data processing system are generally classified into the following two methods. According to one method, a data processing unit for controlling the entire system is connected to other controlled data processing units through a shared memory device and a common bus line. This method is called a hierarchy system. According to the other method, there is no dependent relationship between respective data processing units. This method is termed a non-hierarchy system. In the hierarchy system, since the dependent relationship between controlling and controlled data processing units is distinct, the planning, practicing and evolution of the system are relatively easy. In the hierarchy system, however, the processing capability of the entire system is limited by the queuing in the controlling data processing unit and the processing capability of the controlling data processing unit itself.

In the non-hierarchy system any data processing unit operates independently without being governed by the other data processing units, so that its processing ability is much higher than that of the hierarchy system. However, the non-hierarchy system is not advantageous in that due to a special linkage between respective data processing units, it is often necessary to use a special coupling-release command, for example, a JOIN command or a FORK command. Moreover, as the software or the operating systems of respective data processing units are required to have functions of executing the commands, the computer system becomes complicated and the application programs of the user are adversely affected.

SUMMARY OF THE INVENTION

Accordingly, it is an object of this invention to provide an efficient multiplex data processing system which does not need a special command and can enable a predetermined data processing unit to execute a job having a higher order of priority among a plurality of requested jobs.

Another object of this invention is to provide an improved multiplex data processing system capable of readily increasing or decreasing the number of the data processing units for the purpose of varying the processing capability of the system.

According to this invention, there is provided a multiplex data processing system comprising a plurality of data processing units, a shared memory device commonly used by the plurality of data processing units and a job registeration unit, the job registration unit including means for storing a job service request information, means for judging the order of priority of the job service request information and for storing the job service request information in the shared memory device, and means for generating an interruption signal for supplying the job service request information to the plurality of data processing units, thereby causing the same to execute the job service according to the job service request information stored in the shared memory device.

According to the preferred embodiment of this invention, a plurality of data processing units are connected to form a non-hierarchical structure in which the data processing units have no dependent relationship.

The multiplex data processing system of this invention has such a hardware construction that the job service request information is temporarily stored in the job registration unit, that the data stored in a predetermined address of the shared memory device is read out, that the logical "OR" of the read out data and the data stored in the job registration unit is obtained, that the logical "OR"ed data is written again into a predetermined address of the shared memory device, and that an interruption signal for the data processing units is generated for causing a predetermined data processing unit to execute a job service thereby efficiently processing a plurality of job service requests.

Where a plurality of job service requests concentrate upon one specific data processing unit, the specific data processing unit is masked and the concentrated job requests are shared among remaining data processing units, thus increasing the efficiency and reliability of the system.

BRIEF DESCRIPTION OF THE DRAWING

In the accompanying drawings:

FIG. 4 is a graph showing the symbols of the logical circuits utilized in the system of this invention and the meaning of the symbols;

FIGS. 6 and 7 show one example of the partially detailed connection of the shared memory device shown in FIG. 3;

FIG. 8 shows a time chart useful to explain the operation of the job registration unit shown in FIG. 6;

DESCRIPTION OF THE PREFERRED EMBODIMENTS

Figure 1:
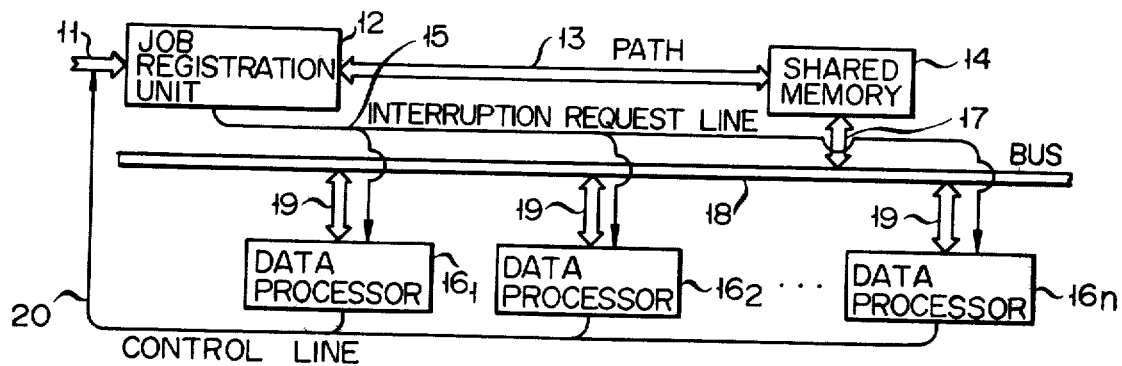
FIG. 1 is a block diagram showing one embodiment of the multiplex data processing system of this invention.

In the multiplex data processing system shown in FIG. 1, job request information for the devices outside of the system (for example, a valve operating request or a data sampling request) and job request information to be executed within the system (for example, a data transfer request to a bulk memory device, or a job execution request for a data processing unit within the system) are applied to a job registration unit 12 from input/ouput devices, not shown, via a path 11. Although the detail of the job registration unit 12 will be described later, it has a function such as storing a plurality of job requests determines, judges the order of priority of these jobs, and generating an address information corresponding to the job requests having the highest order of priority. Consequently, the address information corresponding to the job request having the highest order of priority designates a corresponding address of a shared memory device 14 through a path 13, thus making an access to the designated address. The generated address information corresponds to the address of the shared memory device 14 and is used for the read/write operation as will be described later. The shared memory device 14 is constructed to store 8 bits of information, for example, in each address. Assuming now that the shared memory device 14 comprises a core memory permitting destructive read out, the data stored in the core at a predetermined address is read out during the first half read out cycle of a memory cycle whereas, during the second half write cycle, new replacement data is written in a predetermined address or the original data is written again without any modification. The renewal of the data is performed for the core of the predetermined address in the form of a logical "OR" and the reason therefor will be made clear later. After completion of the write cycle, the job registration unit 12 simultaneously transmits an interruption signal to all of a plurality of data processing units $16_1$, $16_2$, ... $16_n$ through an interruption request line 15. All the data processing units $16_1$, $16_2$, ... $16_n$ should be interrupted one time since, when an interrupt request is generated to interrupt the job currently executed and to start execution a new job, it cannot be determined which job has a higher order of priority.

Upon reception of an interruption signal, each data processing unit interrupts its job being presently executed. At the same time, the content stored in a designated address of the shared memory device 14 is read out through a bus interface 17, a bus 18 and a bus interface 19. If the read out 8 bit information contains a bit at a logical level "1," this will show that the read out information contains a job service request. As a consequence, if the job service request were at a higher order of priority than that of the job now being interrupted temporarily, the data processing unit would process the job at the higher order of priority. Where the order of the priority of the job service request is at the same or a lower order of priority of the interrupted job, the data processing unit transmits the read out information of the job service request to the shared memory device 14 to store again the read out information in the shared memory device 14, thus executing the interrupted job.

With the construction shown in FIG. 1, respective data processing units operate concurrently when they receive the job service request at the same time. According to this invention, for the purpose of preventing such simultaneous operation, one or all of the memory cells of the shared memory device 14 are constructed as the destructive read out cells, each comprising 8 bits, for example. The shared memory device 14 utilizing destructive read out type memory cells prevents concurrent operation of respective data processing units in the following manner.

By providing a 0th flag bit representing the fact that a data processing unit is now being read out while the data processing unit is reading information stored in the memory cell of the shared memory device 14 for the least significant bit (0th bit) of the information format, the multiplex data processing system operates to prevent concurrent operation by utilizing the flag bit as a key bit. Table 1 below shows various states of the information format stored in the memory cells of the shared memory device 14.

Table 1

| | 7 | 6 | 5 | 4 | 3 | 2 | 1 | 0 | |
|---|---|---|---|---|---|---|---|---|---|
| (a) | 0 | 0 | 0 | 0 | 0 | 0 | 0 | 0 | FLAG BIT (KEY) |
| (b) | 0 | 1 | 1 | 0 | 0 | 0 | 0 | 1 | |
| (c) | 0 | 1 | 0 | 0 | 0 | 0 | 0 | 1 | |
| (d) | 0 | 0 | 0 | 0 | 0 | 0 | 0 | 1 | |

In this table the, digits at the upper righthand corners of respective blocks represent the digit positions of the information format, meaning that the information format is constituted by 8 bits of from the 0th to the 7th digit. The "0" and "1" in respective blocks show the binary states of the stored information. The flag bit acting as the key is allocated to the 0th bit of the information format.

In the 8 bit information format shown in Table 1, assume now that the 0th bit or the flag bits are at the logical level "0" whereas the remaining first to seventh bits are at the logical "0" level respectively. Then it is assumed that there is no job service request. On the other hand, when the other bits are at the logical level "0" and any one of the 1th to 7th bits is at the logical level "1,"it is considered that there is a job service request. In other words, this information format can register a maximum of seven jobs. By making the flag bits "0" or "1," respective data processing units are prevented from identifying the same job.

When respective data processing units $16_1$. . . $16_n$ identify specific jobs corresponding thereto by reading the information shown in Table 1, the remaining jobs are written in the shared memory device 14 by changing to "1" the states of the bits corresponding to the queuing job and by changing states of the bit corresponding to the identified job to the "0" state.

The detail of the job processing control of the system will be described in the following with reference to Table 1.

State (a) shows that the job registration unit 12 or any one of the data processing units $16_1$ through $16_n$ is now reading the shared memory device 14 or that the shared memory device 14 is at the initial setting state. State (a) shows that there is no job service request.

State (b) shows that two job service requests, for example, a valve operation request and a data sampling request, are written into the 5th and 6th bits of the job registration unit 12 and that an information "1" is written into a flag bit (0th bit). Under these states, one of the data processing units, $16_1$ for example, reads the format information in the state (b) from the memory cells of the shared memory device 14 in response to the interruption signal sent from the job registration unit 12. Upon completion of this read operation, the information stored in the memory cells in state (b) is rewritten or changed to the information in state (a). In other words, the information that has been stored in the memory cells is destroyed.

In the same manner, when the other data processing units try access to the memory cells of the shared memory device 14, since the information has been read by the data processing unit $16_1$ and since the flag bit (0th bit) among the 8 bit information has already been changed to the logical "0" level, such other data processing units can not read out the information from the memory cells. In such a case, each data processing unit is provided with a timer function with either hardware or software so that the data processing unit can try again to access the shared memory device 14 after a predetermined time. Such an operation is repeated until the flag bit of the 8 bit information changes to the "1" level.

In this manner, only one data processing unit, in this example $16_1$, reads out the information from the memory cells in state (b). The data processing unit $16_1$ compares the order of priority of the job now being executed by it with the order of priority of the information of a lower significant digit along the information read out from the memory cells, that is, the job service request of the 5th bit, and when the order of priority of the job service request of the 5th bit is higher than the former, the data processing unit $16_1$ converts the state of the read out information the (c) state and stores it again in the memory cells of the shared memory device 14. Thereafter, one of said other data processing units reads out the information in state (c) from the memory cells to judge the order of preference in the same manner as above described. When the result of judgment shows that the order of priority of the job service request of the 6th bit is higher, the state of the information is converted to state (d) and written into the memory cells.

Stae (d) is a type of steady state of the multiplex data processing system of this invention. The operation described above is repeated until not only a specific data processing unit is supplied with a job service request but also the other seeking data processing units can read out the information in state (d) from the memory cells.

More particularly, each data processing unit tries to access the memory device 14 so long as a job service request persists so as to execute the job at a higher order of priority among the jobs read out from the memory device 14 and the job now being executed. The provision of the flag bits prevents the other data processing units fom identifying the same job.

The judgment of the order of priority of the bit information described above and the read/write control will be described later in detail.

Due to the time lag of the interruption circuit of the job registration unit 12, or other causes, a plurality of job service requests may concentrate upon a specific data processing unit. Under these conditions, so long as the unit is made ready to accept such plurality of requests by the algorithms determined by the software, the specific data processing unit transmits an overflow signal to the job registration unit 12 through a control line 20. At the same time, among a plurality of job service requests concentrated upon a specific data processing unit except a particular job service request to be executed by the specific unit, the remaining job service requests which must be executed by the other data processing units are written into the memory cells of the shared memory device 14. In this case, by making an interruption signal for the specific data processing unit among a plurality of interruption signals sent from the job registration unit 12 by the overflow signal, the other job service requests concentrated upon the specific data processing unit are prevented from being erased but are processed parallelly by the other data processing units. With this arrangement, it is possible to average the load allocated to respective data processing units of the multiplex data processing system, thereby improving the efficiency of the system.

Figure 2:
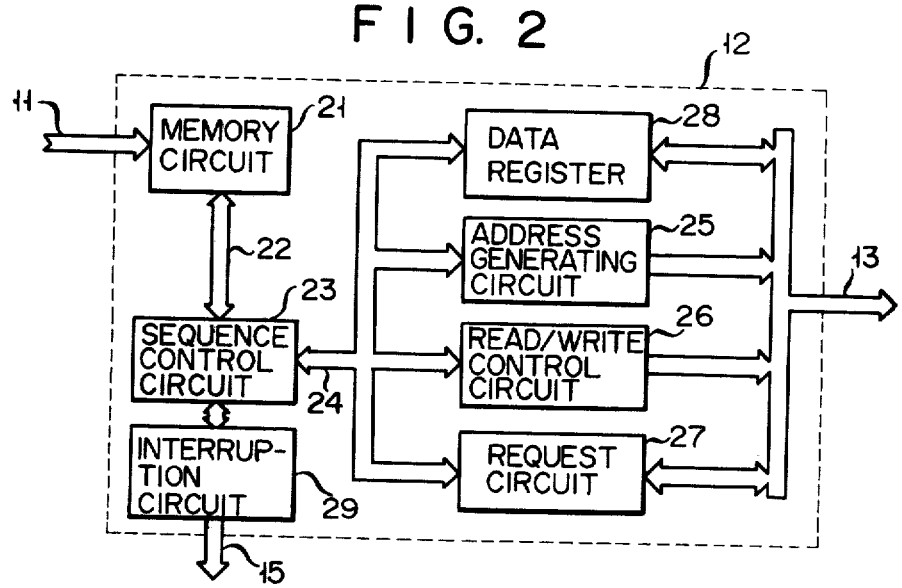
FIG. 2 is a block diagram showing the job registration unit shown in FIG. 1.

FIG. 2 is a block diagram showing the details of the construction of the job registration unit 12. The job service request information sent form a input/output device, not shown, over a path 11 is written into a memory circuit 21 and the job service request information stored therein is sent to a sequence control circuit 23 by a path 22 to be judged as to its order of preference. The job service request information at the highest order of priority is sent to an address generating circuit 25, a read/write control circuit 26, and a request circuit 27 via a path 24. The address generating circuit 25 generates address information corresponding to a predetermined address of the memory cells in the shared memory device 14, whereas the read/write control circuit 21 generates a read signal during the first half of the memory cycle (that is a cycle to read from and write into the memory device 14). The request circuit 27 generates a request signal for using the shared memory device 14. The address information, the request signal and the read signal generated by these circuits are sent to the shared memory device 14 via a path 13. There is also provided a data register 28 for storing the information format consisting of 8 bits as shown in Table 1 and utilized to store information which has been stored in the shared memory device 14 and sent over the path 13. An interruption circuit 29 generates an interruption signal which is sent to respective data processing units $16_1$ through $16_n$ via the path 15 to cause them to execute the interrupting operations. The paths described above are interconnected by internal circuits.

Figure 3:
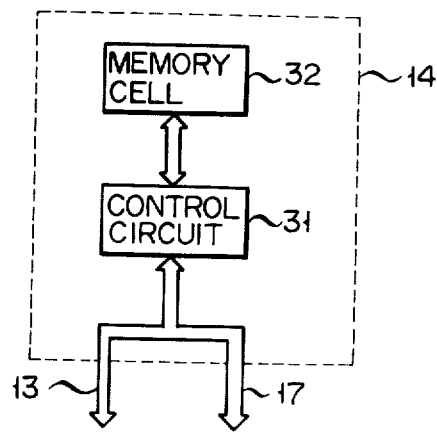
FIG. 3 is a block diagram showing the shared memory device shown in FIG. 1.

FIG. 3 is a block diagram showing the construction of the shared memory device 14. It includes a control ciruit 31 which compares a job service request sent from the job registration unit 12 over path 13 with the job service requests sent from respective data processing units $16_1$ through $16_n$ over bus 17 to determine which one of the access requests is at the highest order of priority. Further, the control circuit 31 determines whether the access request is to be written into the memory cells 32 or to be read out therefrom. Where the access request from the job registration unit 12 is at a higher order of priority, the address information generated by the address generating circuit 25 is sent to the memory cells 32 for designating the address thereof. The memory cells 32 are constructed to store 8 bit information, for example. Then, the information stored in the memory cells 32 whose addresses have been designated is read out and the read out information is sent to the data register 28 again over the path 13. The data register 28 stores the logical sum of said read out information, and the information sent from the sequence control circuit 23, that is, the access request information. A flag bit sent concurrently with the information in the data register 28 is set to the logical "1" level.

The information stored in the data register 28 and the flag bit information are stored again in said designated address of the memory cells 32 by a write signal generated by the read/write control circuit 26 during the second half of the memory cycle. When the restoring of the access request information described above is completed, the interruption circuit 29 generates an interruption signal which is sent to respective data processing units $16_1$ through $16_n$ via line 15.

Each data processing unit $16_1$ through $16_n$ interrupts its job processing operation under excecution in response to the interruption signal, thus advancing to an interrupting processing. Thereafter, operations similar to those described above are performed.

It should be particularly noted that, in the sequence control circuit 23 of the job registration unit 12, the order of priority of a plurality of job service requests applied to the job registration unit 12 via path 11 is determined, whereas, in the shared memory device 14, the order of priority of the job service requests sent from the job registration unit 12 and of the job service requests sent from respective data processing units $16_1$ through $16_n$ are determined.

The detail of the multiplex data processing system of this invention described above is shown in FIGS. 5, 6 and 7. The detail of the system will be described in more detail with reference to FIGS. 5, 6 and 7 and the time chart shown in FIG. 9. FIG. 4 shows signals of the logical circuits utilized in the circuits shown in FIGS. 5, 6 and 7 and the logic. The logical circuits may be those well known in the art. For the sake of description, in FIGS. 5, 6 and 7, there are shown four types of the job service requests and a 3 bit data is stored in one address of the shared memory device 14. Consequently, the information format of a job service request is shown by the following Table 2.

Table 2

| 2 | 1 | 0 |
|---|---|---|
| 0 | 0 | 0 |

As shown in this table, a flag bit is allocated to the 0th bit of the information format. Since the four types of the job service requests are divided into two groups of the order of preference, the information format may be constituted by only two bits of the first and second bit.

The job service request signals transmitted from the input/output device over the path 11 are applied to differentiation circuits 41, 42, 43 ad 44, and the falling edge portions of the output signals of these differentiation circuits are utilized to set corresponding flip-flop circuits 45, 46, 47 and 48, respectively. The output from the flip-flop circuits 45 and 46 are applied to a flip-flop circuit 50 via a NAND gate circuit 49 whereas the outputs from the flip-flop circuits 47 and 48 are applied to a flip-flop circuit 52 via a NAND gate circuit 51. The reset output of the flip-flop circuit 50 is converted into an address signal (hereinafter termed a JR.ADDRESS) via the address generating circuit 25 including an inverter.

The reset outputs of the flip-flop circuits 54 via a NAND gate circuit 53 and the reset output thereof is converted into a control signal (hereinafter termed a JR.WRITE) by the read/write control circuit 26 including an inverter and into an interruption signal (hereinafter termed API) by the interruption signal generator 29 also including an inverter.

The output from the NAND gate circuit 53 is also sent to the request circuit 27 comprising a flip-flop circuit. The output from the request circuit 27 acts as the memory service request signal (hereinafter termed REQUEST), that is, the memory read cycle signal for the shared memory device 14.

NOR gate circuits 55 and 56 are provided for producing the logical "OR" of the data (hereinafter termed SM.DATA 1 AND 2) read out from the shared memory device 14 and the data read out from the data register. The outputs from the NOR gate circuits 55 and 56 are applied to flip-flop circuits 57 and 58 respectively. At a time when a data ready signal (hereinafter called DATA READY) from the shared memory device 14 is applied, the output signals from the NOR gate circuits 55 and 56 are set in the flip-flop circuits 57 and 58 respectively, which produces signals JR.DATA 1 and JR.DATA 2, respectively. Means for generating a flag bit information, for example, a source of positive voltage +V, produces the signal JR.DATA 0. The 0th bit of the information having a format as shown in Table 1 corresponds to signal JR.DATA 0, the first bit to signal JR.DATA 1 and the second bit to signal JR.DATA 2. These signals are written into the shared memory device 14 through path 13 under the control of the WRITE signal produced by the READ/WRITE control circuit 26.

Figure 5:
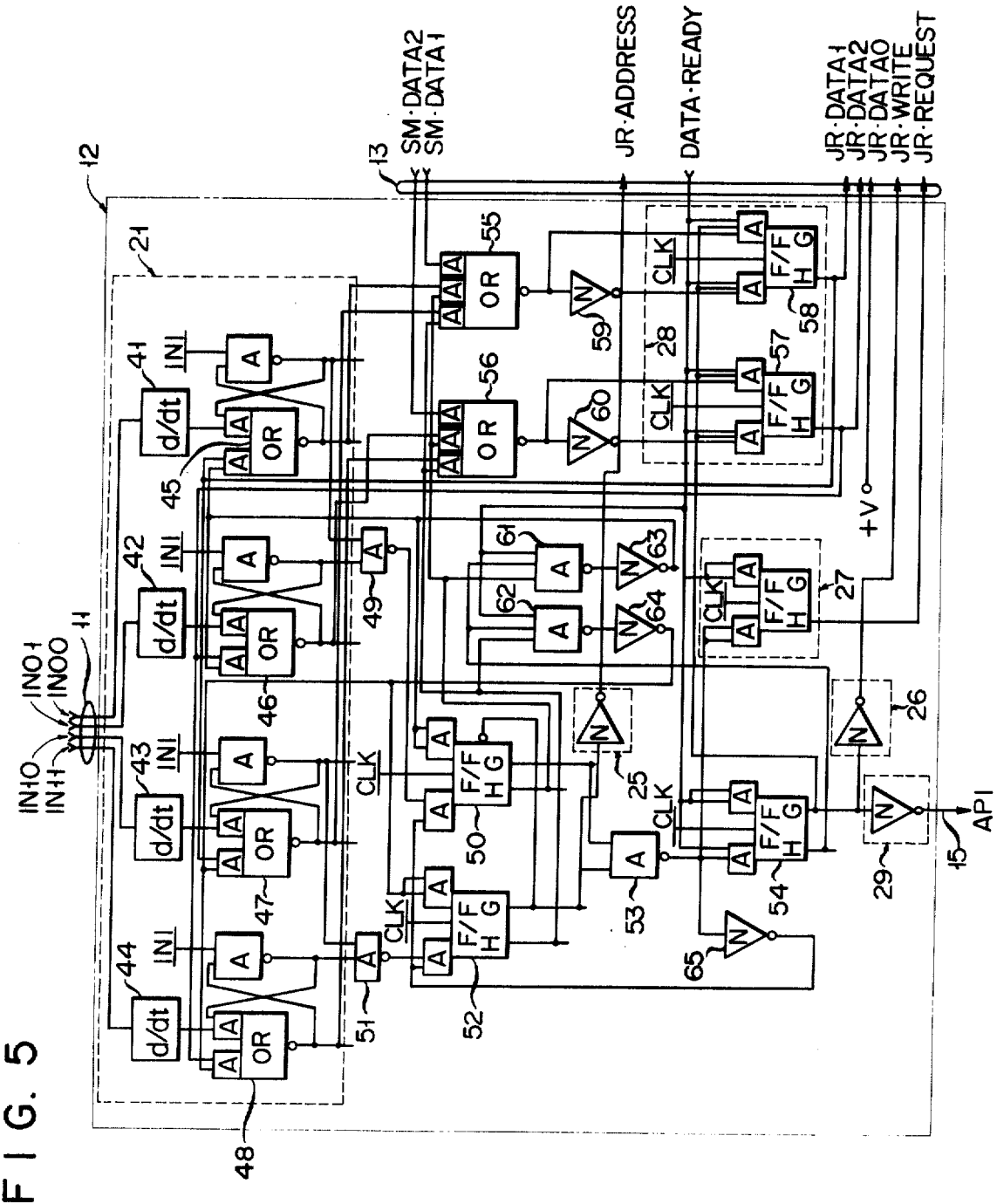
FIG. 5 is a connection diagram showing one example of the detailed circuit of the job registration unit shown in FIG. 2.

In FIG. 5, respective blocks shown in FIG. 2 are bounded by dotted lines, and the sequence control circuit 23 corresponds to portions not bounded by dotted lines. Further, symbols INI and CLK in FIG. 5 represent signals respectively produced by an initializing circuit and a clock pulse generator, not shown. It should be understood that the circuit construction of the job registration unit 12 may be different from that shown in FIG. 5 provided that it includes means for making an access to the shared memory device 14 and means for providing interruption signals to a plurality of data processing units.

Figure 6:
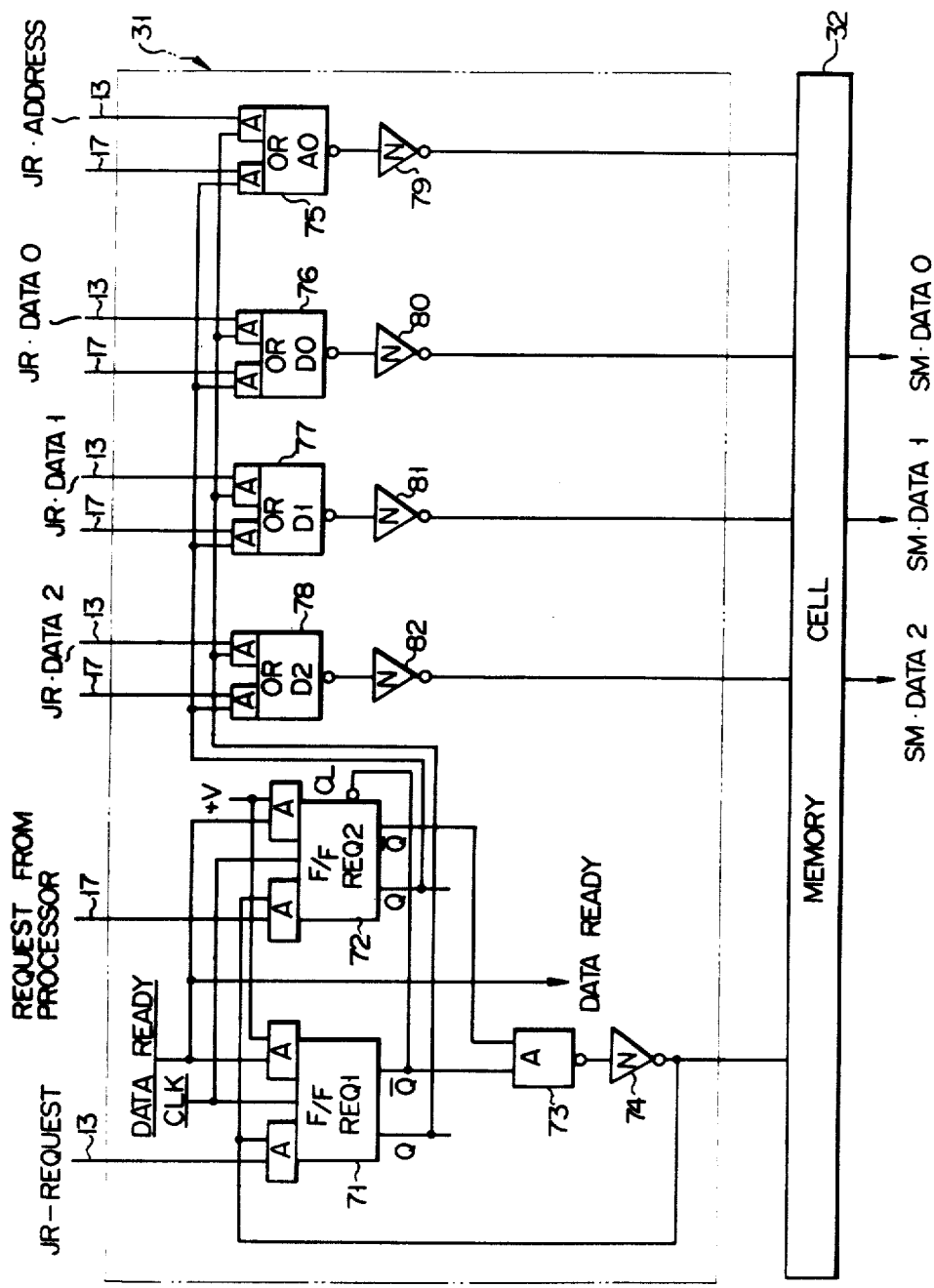

FIG. 6 shows the detail of the circuit construction of the shared memory device 14. Thus, a signal JR.REQUEST sent from the request circuit 27 of the job registration unit 12, shown in FIG. 5, over path 13 sets a flip-flop circuit 71. Each data processing unit, whose job service operation has been interrupted by an interruption signal from the job registration unit 12, sends a memory use request signal (REQUEST) to memory cells 32 over bus 17. However, for the sake of simplicity, only one flip-flop circuit is shown so that the memory use request signal (REQUEST) of one data processing unit is set in a flip-flop circuit 72. It will be understood that if a plurality of flip-flop circuits were provided corresponding to a plurality of data processing units, it would be possible to set the memory use request signals of all data processing units.

The operation of the circuit shown in FIG. 6 for judging the order of priority is as follows. At first, since flip-flop circuit 71 and 72 are in their cleared states, upon application of the REQUEST signals from path 13 and 17, the AND condition on the set side of each flip-flop circuit holds so that flip-flop circuits 71 and 72 are set. When either one of the REQUEST signals is applied, only a corresponding flip-flop circuit is set. The clock pulse CLK is an internal clock pulse signal similar to the clock pulse signal CLK shown in FIG. 5 and is used to set and reset the flip-flop circuits 71 and 72. When either one of these flip-flop circuit is set, the AND condition on the set side of the other flip-flop circuit does not hold so that this other flip-flop circuit would not be set even though it receives a REQUEST signal. The flip-flop circuit 71 is applied to the clear terminal CL of the flip-flop circuit 72 clearing the same. This means that the order of priority of the job service request of the flip-flop circuit 71 is higher than that of the job service request of the flip-flop circuit 72 thus determining which one of the job service requests of the job registration unit and the data processing unit has a higher order of priority.

When either one of the flip-flop circuits 71 and 72 is set, its set output signal is transmitted to memory cells 32 via a NAND gate circuit 73 and an inverter 74. Four NOR gate circuits 75, 76, 77 and 78 select data and address information sent over path 13 and data and address information sent over bus 17. Such selection is done in accordance with the set state of the flip-flop circuits 71 and 72. A NOR gate circuit 75 is used for selecting the address information while the NOR gate circuits 76, 77 and 78 are used for selecting the data. The outputs from these NOR gate circuits 75 are transmitted through corresponding inverters 79 through 82. An ADDRESS signal passing through the NOR gate circuit 75 and the inverter 79 designates an address in the memory cells 32, and the DATA are written in the designated addresses through NOR gate circuits 76, 66 and 78 inverters 80, 81 and 82 under the control of a WRITE signal sent from the job registration unit 12. When the data writing operation in the memory cells 32 is over, the control circuit 31 generates a DATA-READY signal which is applied to the reset terminal of the flip-flop circuit 71. This signal holds the AND gate condition on the reset sides of the flip-flop circuits 71 and 72 in cooperation with the source voltage +V that enables the gate circuits thereby resetting the flip-flop circuits 71 and 72.

The selection between the reading operation of the memory cells 32 and the writing operation into the memory cells 32 is performed by the WRITE signal and the REQUEST signal sent from the job registration unit 12. More particularly, when the REQUEST signal is "1" and the WRITE signal is "0," the reading operation is performed whereas, when both the REQUEST signal and the WRITE signal are "1," the reading operation is performed. In the case of the read operation, the data is read out from the addresses designated memory cells 32 and the read out data is sent to the data register 28 of the job registration unit 12 through path 13. The data stored in the memory cells 32 are read out therefrom by the access of respective data processing units controlled by the interruption signal, and then the read out data are renewed to be written again into the memory cells 32.

FIG. 7 is a block diagram showing a circuit for performing the read/write control of the memory cells 32. In FIG. 7, the memory cells are connected to a read control circuit 90 and a write control circuit 91. These control circuits can be readily constructed according to well known techniques.

For example, each of the control circuits 90 and 91 may be constituted by a flip-flop circuit which is set by a set input (READ or WRITE signal) and reset by the DATA-READY signal for the memory cells 32. The control circuits 90 and 91 are connected to receive the READ/WRITE signal from respective data processing units $16_1$ through $16_n$ or from the job registration unit 12 through the gate circuit 92 and signal lines 93 and 94 connected to the path 13 and the bus interface 17 shown in FIG. 3. The NAND gate circuit 92 is constituted by NAND gate circuits 95 through 100 and an inverter 101. One input of the NAND gate circuits 95 and 96 is connected to receive a timing signal $t_1$ whereas one input of the NAND gate circuits 97 and 98 is connected to receive another timing signal $t_2$. These timing signals are generated from a timing pulse generator (not shown) in response to the JR-REQUEST signal from the data processing units and the job registration unit. The other input of the NAND gate circuit 95 is connected directly to signal line 93 while the other input of the NAND gate circuit 98 is connected to signal line 93 via the inverter 101. The other input of the NAND gate circuits 96 and 97 is connected to signal line 94. The outputs from the NAND gate circuits 95 and 96 are applied to the read control circuit 90 through a NAND gate circuit 99 whereas the outputs from the NAND gate circuits 97 and 98 are applied to the write control circuit 91 via the NAND gate circuit 100.

The operation of the circuit shown in FIG. 7 will now be described with reference to the waveform shown in FIG. 8. Thus, when a JR-REQUEST signal is applied to the shared memory device 14 from the job registration unit 12 via line 13, the timing signals $t_1$ and $t_2$ are generated from the timing pulse generator (not shown) as shown in FIGS. 8a and 8b in response to the JR-REQUEST signal. Where the request by the job registration unit 12 is a read out operation, a read out signal as shown in FIG. 8c is applied to the NAND gate circuit 95 via the signal line 93. As shown in FIG. 7, the output from the NAND gate circuit 95 is applied to the read control circuit 90 via the NAND gate circuit 99 thereby reading out the content of an address designated by the JR-ADDRESS signal from the memory cells 32 in a manner as above described. The read out data SM-DATA 0 through SM-DATA 2 are stored in the register 28 of the job registration unit 12 via the path 13. Upon completion of this read cycle, the timing signal $t_2$ is generated as shown in FIG. 8b for operating the write control circuit 91 via the NAND gate circuits 97 and 100 since the WRITE signal is produced on a signal line from the job registration unit 12 as shown in FIG. 8c, thereby writing the content of the data register 28 into the memory cells 32.

When a data processing unit transmits a job service request signal to the shared memory device 14, or when data is written into the memory cells, a signal is produced on the signal line 94 through bus 17 as shown in FIG. 8b. The read control circuit 90 is operated by the timing signal $t_1$ via the NAND gate circuits 96 and 99 for reading out data stored in a predetermined address of the memory cells 32. Then, the write control circuit 91 is operated by the timing pulse $t_2$ via the NAND gate circuits 97 and 100 for writing data in a predetermined address of the memory cell 32 as shown in FIG. 6. On the other hand, upon readout of the contents of the memory cell 32 by the data processor, the readout control circuit 90 is made operative through the NAND circuit 95 and NAND circuit 99 by causing the signal line 93 and the timing signal $t_1$ to have a logical level of "1" as shown in FIG. 8(c) in order to read out the data stored in a specified address of the memory cell 32. Even if, however, the timing signal $t_2$ comes, thereafter, to have a logical level of "1," the NAND circuit 98 remains inoperative because the logical level of the signal line 93 is inverted by the inverter 101, and, as a result, the NAND circuit 100 remains to have a logical level of "0" as shown in FIG. 8(f). At this time, the write control circuit 91 is not operated so that data is not written into the memory cells 32. Accordingly, the content of the predetermined address of the memory cells 32 has specific characteristics, for example, all "0,".

In this manner, destructive reading of the memory device is performed which is an important feature of this invention. More particularly, when a data processing unit reads out the content of the memory cells 32 of the shared memory device 14 by changing the content of a designated address to all "0," even when another data processing unit reads out the content of the same address of the memory cells 32, it is possible to obtain information of all "0" representing that all jobs are not in the queuing condition, whereby the other data processing units are prevented from identifying the same job.

Figure 9:
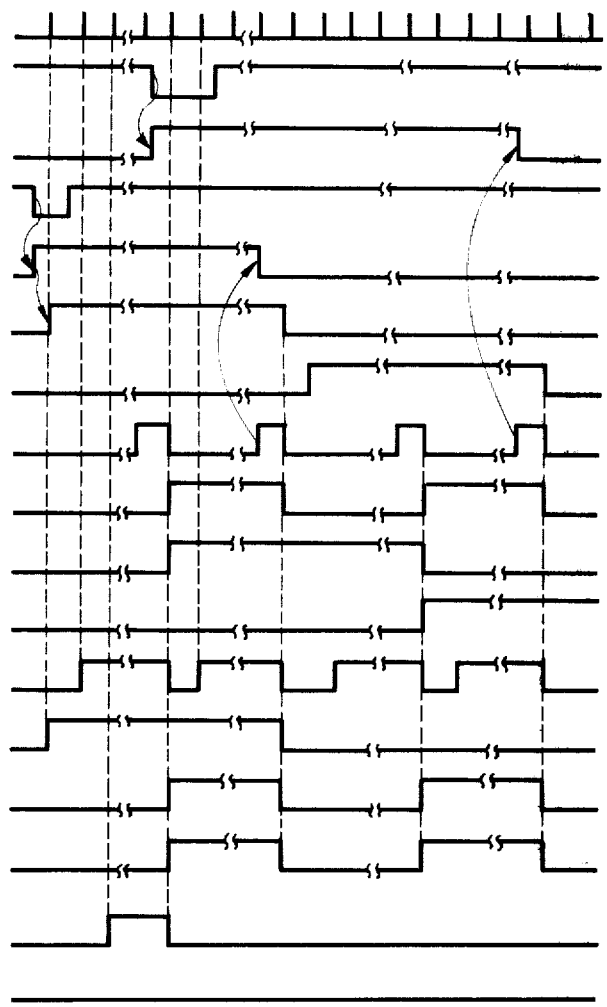
FIG. 9 shows a time chart of various elements useful to explain the operation of the job registration unit shown in FIG. 6.

The operation of the circuits shown in FIGS. 5 and 6 will now be described with reference to the time chart shown in FIG. 9. During the operation of the system of this invention, the internal clock pulse signal is generated as shown in FIG. 9a. Suppose now that following input IN10, input IN01 is applied to the job registration unit 12. As above described, four inputs IN00, IN01, and IN11 are divided into two groups, one consisting of IN10 and IN11 and the other consisting of IN00 and IN01. It is assumed now that the order of priority of the group of IN10 and IN11 is higher than that of the group of IN00 and IN01. The group of IN00 and IN01 is allocated to the first bit and the group of IN10 and IN11 to the second bit. The order of priority is determined by the flip-flop circuits 50 and 52. When the input IN10 is applied to the job registration unit 12 as shown in FIG. 9d, the flip-flop circuit 47 is set through the differentiation circuit 43 as shown in FIG. 9e. When the flip-flop circuit 47 is set in this manner, the flip-flop circuit 52 will be set by the next clock pulse CLK as shown in FIG. 9f. Then, the output of the flip-flop circuit 52 changes the logical level of the ADDRESS signal from "0" to "1" through the address generator 25 as shown in FIG. 9m. Accordingly, an ADDRESS 1 is sent to the shared memory device 14 via the path 13. The output from the flip-flop circuit 52 sets the flip-flop circuit 27 for the memory use request (that is the request signal generator 27) via the NAND gate circuit 53. The REQUEST signal from the flip-flop circuit 27 (request signal generator) assumes the logical level "1" as shown in FIG. 9l. This REQUEST signal is a signal for using the read cycle. At the time when the REQUEST signal is produced, the flip-flop circuit 54 is still in its reset state as shown in FIG. 9i, so that its output inverted by inverter 26 is used as a WRITE signal at the logical level "0." Accordingly, this REQUEST signal sets the flip-flop circuit 71 via the path 13 at the next clock pulse thus supplying a data request signal to the memory cells 32. The address signal shown in FIG. 9m designates address 1 of the memory cells 32 via the path 13, NOR gate circuit 75 and inverter 79. As a consequence, the information stored in the address 1 of the memory cells 32 is read out. When the read cycle is over, the memory cells 32 produce a DATA READY signal as shown in FIG. 9h. This DATA READY signal sets the flip-flop circuit 54 at the next clock pulse as shown in FIG. 9a, resets the flip-flop circuit 71 as shown in FIG. 9g, and sets the flip-flop circuit 27 with the result that the logical level of the REQUEST signal changes to "0" (FIG. 9l).

It is now assumed that the content of the address 1 of the memory cells 32 is expressed by $$\begin{array}{|c|c|c|} \hline 2 & 1 & 0 \\ \hline 0 & 0 & 0 \\ \hline \end{array} : \text{address 1} \qquad (1)$$

Since the flip-flop circuit 47 of the memory circuit 21 has already been set (FIG. 9e) and the flip-flop circuit 48 reset, the flip-flop circuit 58 of the data register 28 maintains its set state (FIG. 9j) and the flip-flop circuit 57 maintains its reset state (FIG. 9k). Further, since the voltage of the flag bit is clamped to voltage $+V$, the data JR·DATA 0 is at the logical level "1." As a consequence, the bits of the data JR·DATA 0 through JR·DATA 2 sent to the address 1 of the shared memory device 14 from the job registration unit 12 over path 13 are as follows $$\begin{array}{|c|c|c|} \hline 2 & 1 & 0 \\ \hline 0 & 1 & 1 \\ \hline \end{array} : \text{address 1} \qquad (2)$$

The logical "OR" of the output from the memory circuit 21 and the information SM·DATA 1 and SM·DATA 2 read out from the shared memory device 14 are processed by the NOR gate circuits 55 and 56.

The next clock pulse sets again the flip-flop circuit 27 and the logical level of the REQUEST signal changes to "1" as shown in FIG. 9l. The cycle performed by this REQUEST signal is the write cycle. Since the flip-flop circuit 54 has been set as shown in FIG. 9i, the logical level of the WRITE signal is "1" (FIG. 9o). Accordingly, the data "011" of (2) is written in the address 1 of the memory cells 32 in this write cycle. When this write cycle is over, the memory cell 32 generates again a DATA·READY signal (FIG. 9h) which resets the flip-flop circuit 47 as shown in FIG. 9e which has been storing the job service request of IN10. When the flip-flop circuit 47 resets, the flip-flop circuit of the request circuit 27 is reset thus changing the REQUEST signal to "0" (FIG. 9l). At the same time, the interruption signal API changes to "0" level thus applying an interruption signal to respective data processing units.

When one of the data processing units $16_1$ through $16_n$ receives an interruption signal API, it temporarily interrupts its job processing operation for making access to the shared memory device 14. If the order of priority of the job service request of IN10 is higher than that of the job service request, the above description is executed. Thus, while said one data processing unit is executing the job service of IN10, the other data processing units also execute the job service of IN01 in the same manner.

For the job service request of IN01, the flip-flop circuit 46 is set (FIG. 9c) while the flip-flop circuit 50 of the sequence control circuit 23 is reset (FIG. 9g), and the read/write operation of the address 1 is changed to address 0. In lieu of the flip-flop circuit 58 of the data register 28, the flip-flop 57 is set (FIG. 9k). The job service request of IN01 is processed in the same manner as the job service request of IN10.

In this case, the information (3) read out from the address 0 of the memory cells 32 is expressed as follows.

$$\begin{array}{|c|c|c|} \hline 2 & 1 & 0 \\ \hline 0 & 0 & 0 \\ \hline \end{array} : \text{address } 0 \quad (3)$$

As above described, the order of priority of the job service requests and the data processing unit access request is determined by the flip-flop circuit 71 and 72. Although the flip-flop 72 is not set in FIG. 9(q), if a request is made from the data processing unit, the flip-flop is, of course, set.

Although, in the foregoing description, bus 18 has not been described in detail, as is well known in the art, the state of the bus, for example, whether the bus line is occupied by a specific data processing unit or idle, can readily be determined by providing a bus busy bit for the data processor, which enables the system to make a bus control easier.

Figure 10:
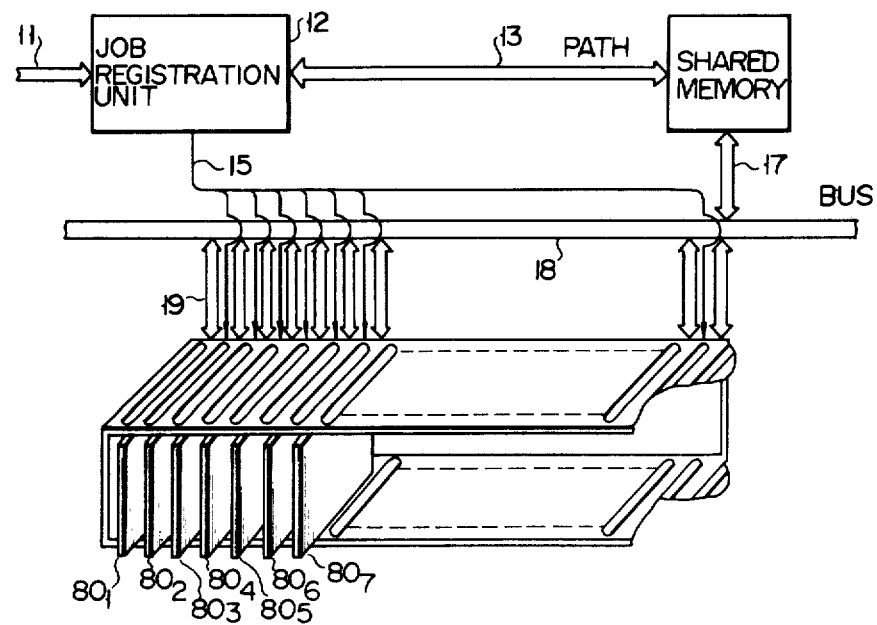
FIG. 10 is a block diagram showing a modified embodiment of this invention wherein respective data processing units are fabricated on independent printed circuit boards.

FIG. 10 shows a modified embodiment of this invention. As above described, in the multiplex data processing system of this invention, there are provided a plurality of data processing units. Accordingly, by forming one data processing unit on a single printed circuit board 80, the number of the data processing units can readily be varied by varying the number of the printed circuit boards, thereby making it easier to increase or decrease the capacity of the system.

As can be noted from the foregoing description the multiplex data processing system of this invention is a non-hierarchical system because there is no dependent relationship among various data processing units.

In the foregoing embodiments, it was described that, where a condition accepting an interruption request of a data processing unit holds and where a plurality of job service requests concentrate upon a data processing unit an interruption signal request is made for the job registration unit by an overflown control signal. This can be done in the following manner. In the multiplex data processing system shown in FIG. 1, assume that, while a specific data processing unit, for example, 16₁, is executing the program, another data processing unit is requested to execute an urgent job service. Then, by the supervision of an operating system, the service request information of the urgent job is stored in the memory cells 32 of the shared memory device 14. Thereafter, the specific data processing unit 16₁ sends a control signal requesting the generation of an interruption signal to the job registration 12 2 via control line 20. In response to this control signal, the job registration unit 12 generates an interruption signal API which is supplied to the other data processing units for executing the urgent job. By masking the interruption signal applied to the specific data processing unit by the control signal, a smooth job service can be assured. In this manner, where one data processing unit is requested to execute an urgent job, this job can be executed by another data processing system.

Although the invention has been shown and described in terms of specific embodiments thereof, it should be understood that many changes and modifications will be obvious to one skilled in the art without departing from the spirit and scope of the invention as defined in the appended claims.

What is claimed is:

1. A multiplex data processing system comprising: two or more data processing units; a shared memory device connected to the data processing units for storing data processed by any one of the data processing units; and a job registration unit connected to the shared memory device for accepting and storing job request information including priority order information for determining the priority level of the job request information, for transferring the job request information with the determined priority level to the shared memory device and for supplying an interrupt signal to the data processing units to control the data processing units so that they execute jobs according to the job request information stored in the shared memory device; said job registration unit comprising a memory circuit for storing job request information, an address generator for generating an address signal which designates a memory location of the shared memory device corresponding to the job request information with highest priority level, a request circuit for generating a signal for requesting from the shared memory device the use of the shared memory device, a data register for storing the logical sum of the data stored in the memory location designated by the address signal and the job request information with highest priority level, a read/write control circuit for designating any one of a read cycle for reading each information bit of data at the memory location designated by the address signal from the shared memory device into the data register and a write cycle for writing the respective information bit of the logical sum of the data stored in the memory location designated by the address signal and the job request information with highest priority level from the data register into the shared memory device, an interrupt signal generator responsive to the writing from the data register into the shared memory device for generating an interrupt signal which is applied to the data processing units to cause the job to be executed by the interrupted data processor indicated by the job request information which is stored in the shared memory device, and a sequence control circuit for controlling the memory circuit, address generator, request circuit, read/write control circuit, data register and interrupt signal generator.

2. The multiplex data processing system according to claim 1 wherein said job registration unit comprises means for generating a key bit stored in said shared memory device, said key bit being used to prevent simultaneous operation of said plurality of data processing units.

3. The multiplex data processing system according to claim 1 which further comprises control lines extending between said job registration unit and response data processing units, said control lines being applied with a control signal generated from said data processing units for causing said job registration unit to generate an interrupt signal for sharing a plurality of job service requests which concentrate upon a specific data processing unit among the other data processing units.

4. The multiplex data processing system according to claim 1 wherein, when an urgent job is desired to be executed by another data processing unit while one of said data processing units is executing a predetermined program, said urgent job is stored in said shared memory device and said one data processing unit generates a control signal which is applied to said job registration unit for applying an interrupt signal to said another data processing unit.

5. The multiplex data processing system according to claim 1 wherein said plurality of data processing units are connected to constitute a non-hierarchical structure without any depending relationship therebetween.

6. The multiplex data processing system according to claim 1 wherein said sequence control circuit comprises logical circuit means for producing the logical "OR" of the information read out from said shared memory device and the job service request information from said memory circuit.

7. The multiplex data processing system according to claim 1 wherein said sequence control circuit comprises means for judging the order of priority of a plurality of job service request information stored in said memory circuit.

8. The multiplex data processing system according to claim 1 wherein said shared memory device comprises memory cells for storing a job service request information sent from said job registration unit and job service request informations sent from respective data processing units, and a control circuit for controlling reading and writing of said memory cells and for judging the order of priority of the job request information sent from said job registration unit and the job service request informations sent from respective data processing units.

9. The multiplex data processing system according to claim 8 wherein said control circuit further comprises means for preventing said data processing units from identifying the same job.

10. The multiplex data processing system according to claim 8 wherein said shared memory device comprises destructive reading memory cells.

11. The multiplex data processing system according to claim 8 wherein said control circuit comprises means for producing a ready signal when writing or reading operation of said memory cells is completed, said ready signal representing that said memory cells are in a state in which an information can be received or transmitted.

12. The multiplex data processing system according to claim 1 wherein each of said data processing units comprises a printed circuit board thus making it possible to vary the job service capacity of the system in accordance with the volume of the job service requests.

* * * * *